United States Patent
Lawton et al.

(10) Patent No.: US 6,718,451 B2
(45) Date of Patent: Apr. 6, 2004

(54) UTILIZING OVERHEAD IN FIXED LENGTH MEMORY BLOCK POOLS

(75) Inventors: Christopher Lawton, Costa Mesa, CA (US); Chien-I Chang, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 10/059,318

(22) Filed: Jan. 31, 2002

(65) Prior Publication Data

US 2003/0145185 A1 Jul. 31, 2003

(51) Int. Cl.[7] .............................................. G06F 12/00
(52) U.S. Cl. ........................................ 711/170; 711/202
(58) Field of Search .................................. 711/170, 171, 711/172, 173, 202

(56) References Cited

U.S. PATENT DOCUMENTS 5,943,692 A * 8/1999 Marberg et al. ............. 711/203
6,175,900 B1 * 1/2001 Forin et al. .................. 711/156

* cited by examiner

Primary Examiner—Hiep T. Nguyen
(74) Attorney, Agent, or Firm—Kenyon & Kenyon

(57) ABSTRACT

A method of managing a fixed length memory block pool having a plurality of memory blocks includes receiving a memory block address from a memory management module, in which the memory block address corresponds to an available memory block. The method further includes decrementing the memory block address by an amount substantially equal to a size of the overhead area of the available memory block.

24 Claims, 3 Drawing Sheets

UTILIZING OVERHEAD IN FIXED LENGTH MEMORY BLOCK POOLS

FIELD OF THE INVENTION

The present invention is directed to memory in computer systems. More particularly, the present invention is directed to management of fixed length memory block pools.

BACKGROUND INFORMATION

A typical computer system includes a processor, operating system, and memory. The memory typically includes banks of random access memory ("RAM"), read only memory ("ROM"), and hard drive storage. Most systems also include software or firmware to efficiently manage dynamic use of some of the memory, especially the RAM.

Memory in many computer systems is allocated in fixed-length blocks, to avoid issues of memory fragmentation and garbage collection. However, using fixed-length blocks requires that some memory be set aside to track which blocks have been allocated and which have not. The set aside memory is overhead and cannot be used for ordinary tasks, and thus reduces the amount of memory available for the computer system.

Based on the foregoing, there is a need for a method of managing memory that does not require some memory to be set aside, thus reducing overhead.

DETAILED DESCRIPTION

One embodiment of the present invention is a method of adding a layer of memory management firmware or software between a software application and existing memory management firmware, also referred to as a "memory management module", to eliminate the overhead typically required by memory management schemes.

Figures 1, 2:
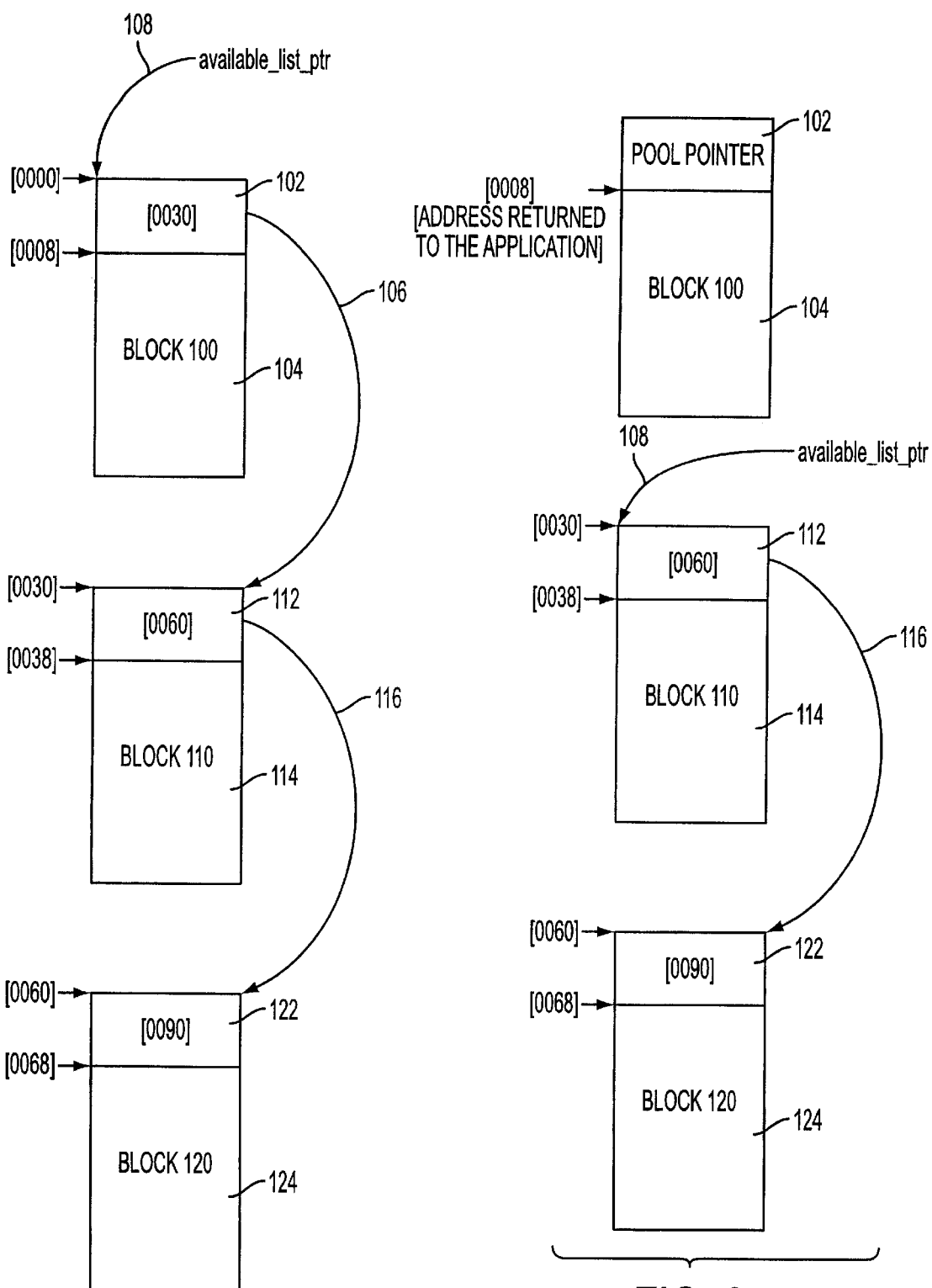
FIG. 1 is a block diagram illustrating a prior art memory management module for efficiently managing dynamic memory use.
FIG. 2 is a block diagram illustrating how a prior art memory management module interfaces with a software application to allow the application the use of a memory block.

FIG. 1 is a block diagram illustrating a prior art memory management scheme or module for efficiently managing dynamic memory use. The memory management module is typically part of an operating system implemented by a computer.

A block pool is shown in FIG. 1 that includes fixed length memory blocks 100, 110 and 120. The block pool may be formed from the RAM of a computer system. The computer system may also include other block pools that have fixed lengths that differ from the lengths of memory blocks 110, 110 and 120.

Each memory block has a section for storing data, and a section for storing information used by the operating system kernel to manage the use of the block. This latter section, referred to as the "overhead section", is not available to a software application for storing data. For example, block 100 has an overhead section 102 and a data section 104, block 110 has an overhead section 112 and a data section 114, and block 120 has an overhead section 122 and a data section 124. In one embodiment, eight bytes of each memory block is dedicated to the overhead section.

In operation, block 100 is the first block of a chain of blocks that form the block pool. An available list pointer 108 points to the first byte (i.e., byte 0000 of block 100) of the first block in the chain. Stored in overhead section 102 of first block 100 is the first address of the next available block (i.e., byte 0030 of block 110). Stored in overhead section 112 of the next available block 110 is the first address of the next available block (i.e., byte 0090 of block 120), and so on. Therefore, all of the available blocks are linked together and the address of the next available block can be returned to an application when it is requested.

FIG. 2 is a block diagram illustrating how a prior art memory management module interfaces with a software application to allow the application the use of a memory block. When the application requests a memory block, the memory management module determines the first available memory block from the available list pointer 108 shown in FIG. 1. In the example of FIG. 2, block 100 is the first available memory block. The memory management module then returns address 0008 of block 100 to the application, since the first 8 bytes (i.e., addresses 0000–0007) are reserved for overhead. The memory management module then places a pool pointer in overhead area 102. The pool pointer identifies the block pool that block 100 is part of. Each block pool has a unique identifier. Available list pointer 108 is then pointed to address 0030 of block 110, since block 110 is now the next available block of the block pool.

One example of an operating system that implements the memory management module described above in conjunction with FIGS. 1 and 2 is the ThreadX Real-Time Operating System available from Green Hills Software Inc.

Figure 3:
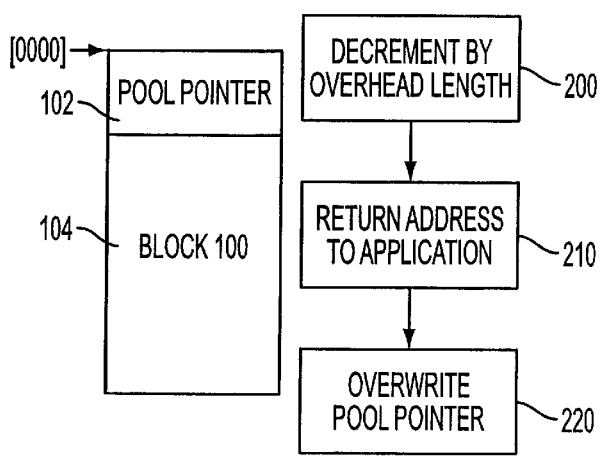
FIG. 3 is a block diagram and flowchart illustrating steps performed by one embodiment of the present invention when an application requests a memory block.

One embodiment of the present invention interfaces with the memory management module in the prior art operating system described above to allow the overhead area of the blocks to be utilized for storage by applications. FIG. 3 is a block diagram and flowchart illustrating steps performed by one embodiment of the present invention when an application requests a memory block. Initially, the present invention receives address 0008 from the memory management module, as described above in FIG. 2. The present invention then decrements the address by the overhead length (i.e., 8 bytes) at step 200. At step 210, the decremented address, 0000, is returned to the application. The entire block 100, including overhead area 102, is now available to the application. The pool pointer, which is written in overhead area 102 as described in FIG. 2, is overwritten by the application because the application is storing information in overhead area 102.

Figure 4:
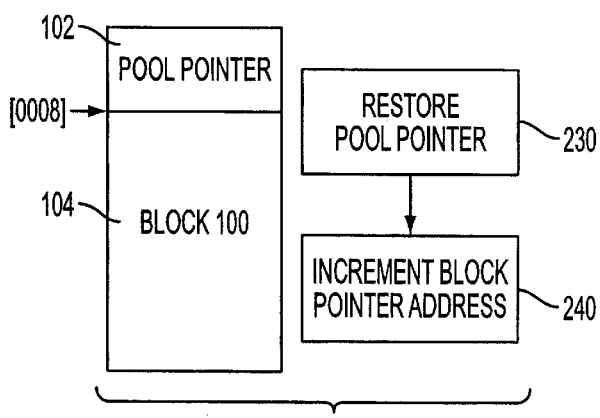
FIG. 4 is a block diagram and flowchart illustrating steps performed by one embodiment of the present invention when the application releases a memory block.

FIG. 4 is a block diagram and flowchart illustrating steps performed by one embodiment of the present invention when the application releases memory block 100. At step 230, the pool pointer is restored to overhead area 102. At step 240, the present invention increments the block pointer address by the length of overhead area 102 (i.e., 8 bytes). The memory management module receives block pointer address of 0008 from the present invention.

Figure 5:
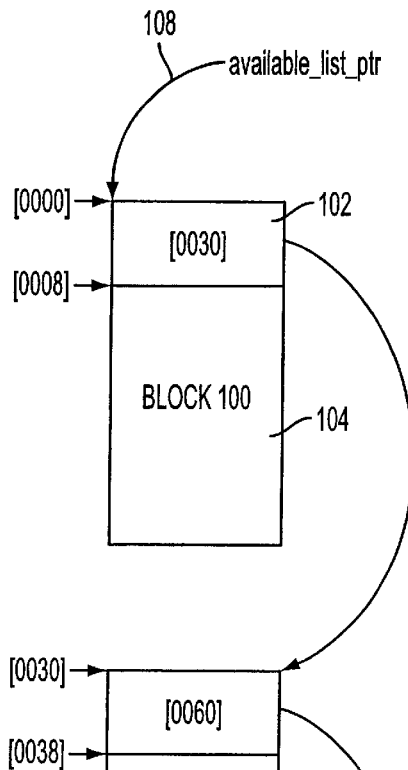
FIG. 5 is a block diagram illustrating the block pool after the memory management module receives the block pointer address from the present invention.
Figure 5:
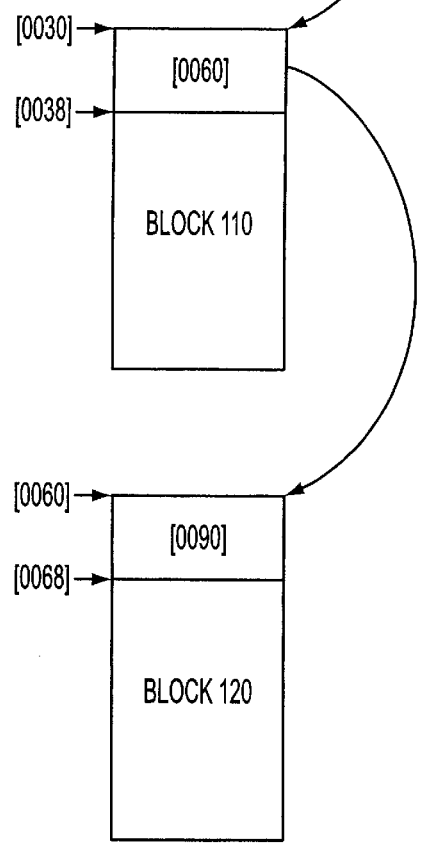

FIG. 5 is a block diagram illustrating the block pool after the memory management module receives the block pointer address from the present invention. The memory management module retrieves the pool pointer from overhead area 102 and determines the next available block in the block pool that is identified by the pool pointer. The address of the next available block (i.e., 0030) is then written in overhead area 102 of block 100, thus overwriting the pool pointer. Block 100 is now available for storage needs of an application.

Figure 6:
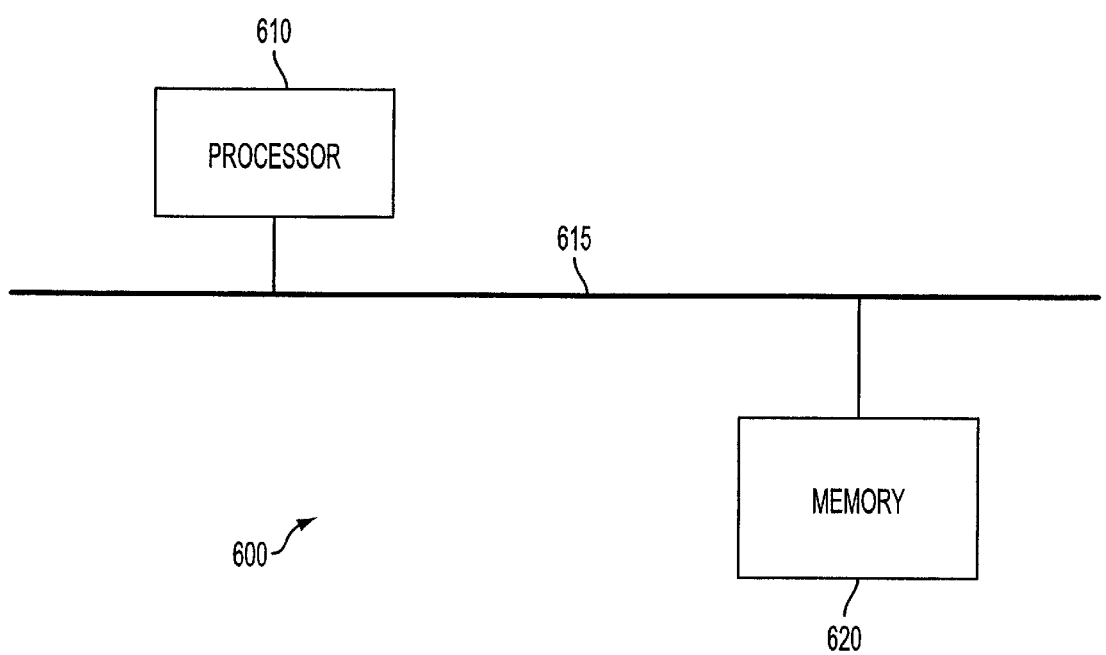
FIG. 6 is a block diagram of a computer system that can implement the present invention.

FIG. 6 is a block diagram of a computer system 600 that can implement the present invention. Computer system 600 includes a processor 610, memory 620 and a bus 615. Processor 610 can be any type of general purpose processor. Memory 620 can include RAM, ROM and hard drive memory, or any other computer readable medium. Memory 620 includes instructions that, when implemented by processor 610, function as an operating system and instructions that implement the present invention. In one embodiment, the operating system is the ThreadX operating system. The steps performed by the present invention can be performed by software, hardware, or any combination of both.

As described, one embodiment of the present invention interfaces with the prior art memory management module to allow overhead areas of memory blocks to be utilized for storage by applications. This increases the amount of memory available to applications in a given block pool.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of managing a fixed length memory block pool having a plurality of memory blocks, said method comprising:
   receiving a memory block address from a memory management module, said memory block address corresponding to an available memory block; and
   decrementing the memory block address by an amount substantially equal to a size of an overhead area of the available memory block.

2. The method of claim 1, further comprising:
   sending the decremented memory block address to an application that has requested a first memory block.

3. The method of claim 2, further comprising:
   writing a pool pointer in the overhead area of the available memory block; and
   incrementing the decremented memory block address by the amount.

4. The method of claim 1, wherein the plurality of memory blocks comprise a plurality of overhead areas, the overhead areas used to track which of the plurality of memory blocks have been allocated.

5. The method of claim 4, wherein the plurality of overhead areas comprise a memory portion of the plurality of memory blocks.

6. The method of claim 1, wherein the memory management module is part of an operating system.

7. The method of claim 6, wherein the operating system is ThreadX.

8. The method of claim 1, wherein the plurality of memory blocks is comprised of random access memory.

9. The method of claim 3, wherein the pool pointer identifies the memory block pool.

10. A computer system comprising:
    a processor;
    a bus coupled to said processor; and
    a memory coupled to said bus;
    wherein said memory comprises instructions, which when executed by said processor, cause said processor to implement:
    a memory management module;
    an interface to said memory management module; and
    an application;
    wherein said memory management module manages a fixed length memory block pool having a plurality of memory blocks formed in said memory, and said interface comprises instructions that:
    receive a memory block address from a memory management module, said memory block address corresponding to an available memory block; and
    decrement the memory block address by an amount substantially equal to a size of an overhead area of the available memory block.

11. The system of claim 10, said interface further comprising instructions that:
    send the decremented memory block address to said application.

12. The system of claim 11, said interface further comprising instructions that:
    write a pool pointer in the overhead area of the available memory block; and
    increment the decremented memory block address by the amount.

13. The system of claim 10, wherein said plurality of memory blocks comprise a plurality of overhead areas, the overhead areas used to track which of said plurality of memory blocks have been allocated.

14. The system of claim 10, wherein the memory management module is part of an operating system.

15. The system of claim 14, wherein said operating system is ThreadX.

16. A computer readable medium having instructions stored thereon which, when executed by a processor, cause the processor to manage a fixed length memory block pool having a plurality of memory blocks by:
    receiving a memory block address from a memory management module, the memory block address corresponding to an available memory block; and
    changing the memory block address so that a storage area of the available memory block includes an overhead area.

17. The computer readable medium of claim 16, said instructions further comprising:
    sending the changed memory block address to an application that has requested a first memory block.

18. The computer readable medium of claim 17, said instructions further comprising:
    changing the changed memory block address to a value that was received from the memory management module; and
    writing a pool pointer in the overhead area of the available memory block.

19. The computer readable medium of claim 16, wherein the plurality of memory blocks comprise a plurality of overhead areas, the overhead areas used to track which of the plurality of memory blocks have been allocated.

20. The computer readable medium of claim 19, wherein the plurality of overhead areas comprise a memory portion of the plurality of memory blocks.

21. The computer readable medium of claim 16, wherein the memory management module is part of an operating system.

22. The computer readable medium of claim 21, wherein the operating system is ThreadX.

23. The computer readable medium of claim 16, wherein the plurality of memory blocks is comprised of random access memory.

24. The computer readable medium of claim 18, wherein the pool pointer identifies the memory block pool.

* * * * *